United States Patent [19]

Szymanski et al.

[11] Patent Number: 5,566,337

[45] Date of Patent: Oct. 15, 1996

[54] METHOD AND APPARATUS FOR DISTRIBUTING EVENTS IN AN OPERATING SYSTEM

[75] Inventors: Steven J. Szymanski, Cupertino; Thomas E. Saulpaugh, San Jose; William J. Keenan, Redwood City, all of Calif.

[73] Assignee: Apple Computer, Inc., Cupertino, Calif.

[21] Appl. No.: 242,204

[22] Filed: May 13, 1994

[51] Int. Cl.⁶ ........................................ G06F 9/00
[52] U.S. Cl. ...................... 395/733; 395/650; 395/700
[58] Field of Search ....................... 395/650, 725, 395/700, 775

[56] References Cited

U.S. PATENT DOCUMENTS

| 5,155,842 | 10/1992 | Rubin | 395/182.2 |
| 5,237,684 | 8/1993 | Record et al. | 395/650 |
| 5,291,608 | 3/1994 | Flurry | 395/725 |
| 5,305,454 | 4/1994 | Record et al. | 395/650 |
| 5,321,837 | 6/1994 | Daniel et al. | 395/650 |
| 5,355,484 | 10/1994 | Record et al. | 395/650 |
| 5,430,875 | 7/1995 | Ma | 395/650 |

FOREIGN PATENT DOCUMENTS 0528222 2/1993 European Pat. Off. .
WO91/03017 3/1991 WIPO .

OTHER PUBLICATIONS

IBM: 'OS/2 2.0 Presentation Manager Programming Guide', Mar. 1992, QUE, USA, p. 31–5, last paragrph, p. 31–6, paragraph 3.

*Primary Examiner*—Jack B. Harvey
*Assistant Examiner*—Sumati Lefkowitz
*Attorney, Agent, or Firm*—Burns, Doane, Swecker & Mathis

[57] ABSTRACT

In a computer including an operating system, an event producer for generating an event and detecting that an event has occurred in the computer and an event consumer which need to be informed when events occur in the computer, a system for distributing events including a store for storing a specific set of events of which the at least one event consumer is to be informed, an event manager control unit for receiving the event from the event producer, comparing the received event to the stored set of events, and distributing an appropriate event to an appropriate event consumer, and a distributor for receiving the event from the control unit and directing the control unit to distribute an appropriate event to an appropriate event consumer.

24 Claims, 10 Drawing Sheets

METHOD AND APPARATUS FOR DISTRIBUTING EVENTS IN AN OPERATING SYSTEM

CROSS-REFERENCE TO RELATED APPLICATIONS

The present application is related to a patent application No. 08/245,141 entitled "Method and Apparatus for Handling Requests Regarding Information Stored in A File System", in the name of Steven James Szymanski and Bill Monroe Bruffey, filed on May 13, 1994, herein incorporated by reference.

BACKGROUND

The present invention is directed to a method and apparatus for distributing information about events occurring in a computer, and in particular an event manager which manages the distribution of those events to the appropriate entities within the computer.

For purposes of this description, an event is any occurrence in a computer of which software programs running on that computer or on a connected computer might need to be informed. Events may include occurrences such as, for example, a keystroke, a mouse click, disk insertion and ejection, network connection and disconnection, the computer entering a "sleep mode" shutdown, a window uncovered (i.e., the contents of the window need to be redisplayed), a new file created, a directory renamed, the contents of file changed, and the tree space on a volume changed, etc.

Interrupts and error conditions may also be counted as atypical examples of events. In particular, interrupts need to be handled by a program so an event manager is an inappropriate solution. However, the code which does handle the interrupt might generate an event based on the interpretation of the interrupt. For example, the computer might generate an interrupt when the user inserts a floppy disk. The interrupt itself is unlikely to be propagated by the event manager, but it would be reasonable for the interrupt handler to produce a "disk inserted" event. Error conditions are similar. Most of the time it is necessary for one of the computer programs on the system to handle the error, therefore more direct point to point mechanisms are appropriate. However, there are kinds of errors which are more advisory in nature which would be appropriate to be sent via events. For example, some portable computers take various actions to reduce power consumption when the battery gets low. It would be appropriate to produce an event called "battery low" to inform all software programs of the condition, and have all of the software which can reduce power consumption consume these events.

Currently, known operating systems all have some type of mechanism for managing the events that occur within the computer. However, these mechanisms use a point-to-point method of managing the events. That is, the entities producing or detecting events distribute the events to the entities using the events. To accomplish this, all of the entities producing or detecting events must know which entities they must notify when a particular event is generated within the computer. This configuration is very cumbersome and inefficient. Further, it is resource intensive since all entities producing or detecting events must have information on all the events they produce or detect and also on all the entities interested in those events. This information is both extensive and constantly changing, causing modifications to be difficult.

Further, point-to-point mechanisms lack flexibility. Under point-to-point schemes, if there is a new consumer of an event, a new version of the producer must be released which knows about the new consumer. Or if a new kind of event becomes necessary, a new version of the event manager must be released which knows how to distribute the new kind of event.

It is desirable to provide an apparatus for efficiently dealing with all kinds of events in an operating system and for distributing information regarding specific kinds of events to programs which require such information. To this end, it is also desirable to improve the system performance and reduce the resources required to distribute such information. To meet these goals, it is desirable to provide an apparatus for managing events in which communication between the event producers and consumers is facilitated without requiring each event producer to be aware of all of the event consumers.

BRIEF STATEMENT OF THE INVENTION

In accordance with the present invention, the foregoing objectives, as well as others, are achieved through centralization of event management, and in particular, by providing an event manager for handling the distribution of events within the computer.

According to one embodiment, in a computer including at least one event producer for detecting that an event has occurred in the computer and generating an event and at least one event consumer which need to be informed when events occur in the computer, a system is provided for distributing information about events. The system includes storing means for storing a specific set of events of which the event consumers are to be informed, an event manager control means for receiving the event from the event producer, comparing the received event to the stored set of events, and distributing an appropriate event to an appropriate event consumer, and a distributor for receiving the event from the control means and directing the control means to distribute an appropriate event to an appropriate event consumer.

According to another embodiment, a system is provided for distributing events occurring in a computer. The system comprises event producers for detecting that an event has occurred in the computer, generating an event, and generating a description of the event and event consumers which need to be informed when events occur in the computer, the event consumers comprising a first and a second class of consumers. The system further comprises storing means for storing a specific set of events of which the event consumers am to be informed, event manager control means for receiving the event from the event producers and comparing the received event to the stored set of events, distributor means, responsive to the event control means, for deciding if an event should be passed to an event consumer. The event manager control means comprises first means for sending an event to appropriate event consumers of a first type in accordance with the stored set of events, and second means for sending the event to appropriate event consumers of a second type responsive to the distributor means.

According to another embodiment, a method is provided for distributing events occurring in a computer. The method comprises the steps of determining that an event has been detected by an event producer in the computer, storing, in a storing means, a specific set of events of which an event consumer is to be informed, receiving the event in an event control means from the event producer and comparing the received event to the stored set of events. The method further comprises receiving the event in a distributor means from the control means, directing the control means to distribute an appropriate event to an appropriate event consumer, and distributing, via the control means, an appropriate event to an appropriate event consumer.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The present invention will now be described in more detail with reference to preferred embodiments of the method and apparatus, given only by way of example, and with reference to the accompanying drawings, in which.

DETAILED DESCRIPTION

Figure 1:
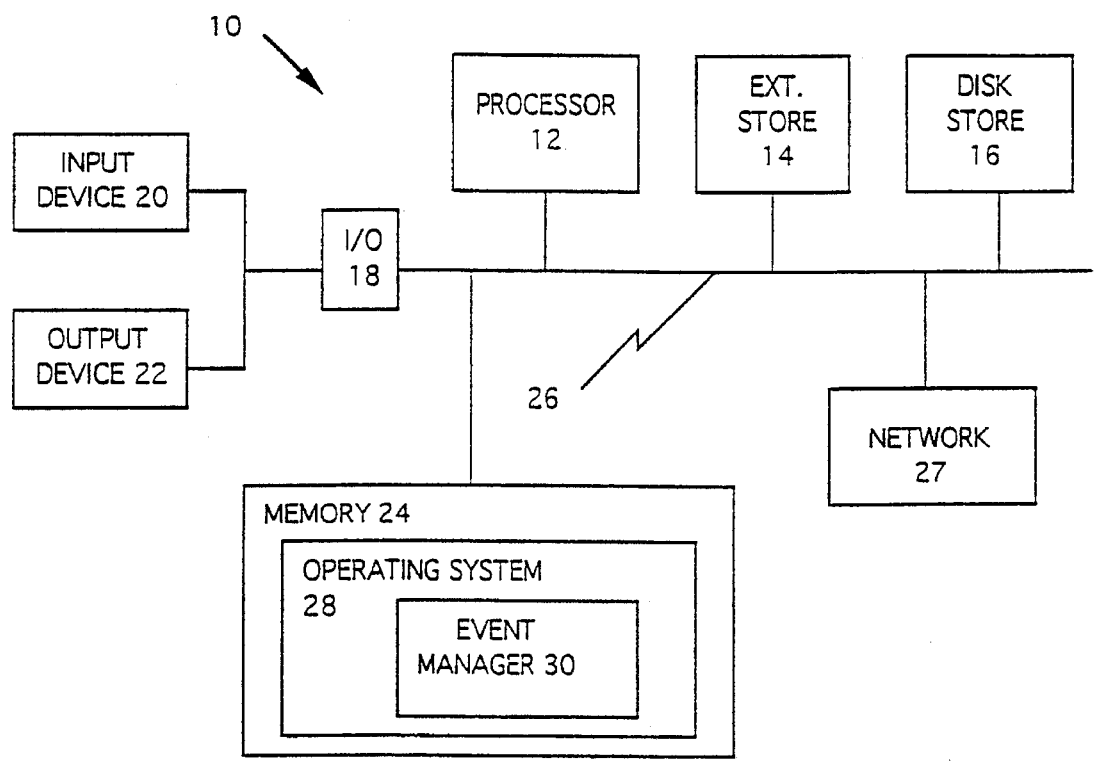
FIG. 1 is a block diagram of an exemplary computer on which the present invention can be implemented.

In general, the invention recognizes the need for efficient communications between different entities within the computer concerning events occurring within the computer. In particular, communications are required to inform entities within the computer about the events produced by other entities. The method required to handle these communications is complicated by the fact that the entities involved do not know the identity of the other entities. The method is further complicated by the fact that the identity of the entities needing to know about events and the lists of events which can occur are subject to constant change.

One goal for the event manager according to the present invention is to provide a common service which supports a majority of these kinds of communications. The information which needs to be communicated is referred to as the event. According to one embodiment, the event is described by three pans, an event identifier which indicates the kind of event, an event subject, which identifies the entity which the event happened to, and event information which describes how the event occurred. The entities within the computer which are the sources of the information are referred to as the producers of the event. In particular, an event producer is any software on a computer that is responsible for generating an event or for detecting that the computer hardware has generated an event. The event producer then generates a description for each event it produces or detects. The entities within the computer which need to receive the information are referred to as consumers of the event. In particular, an event consumer is any program that needs to be informed when an event has occurred and needs to be informed of the description of the event. Any intermediate service which moderates the connection between the producers and consumers of an event is referred to as the distributor of the event.

According to one embodiment of the present invention, there are two classes of event consumers which differ in their relationships to other consumers of an event, namely broadcast consumers and sequential consumers. Broadcast consumers have no relationship with other consumers. They do not need to know if other consumers exist, nor in what order consumers are informed of the event, as long as they themselves are eventually informed. Sequential consumers, on the other hand, have very definite relationships with other consumers. They require that no other consumer be told about an event while they themselves are still processing it, and they require the ability to influence when in the sequence they receive the event. In addition, many sequential consumers require the ability to modify the event itself, and even block an event from being received by other consumers. Consumers are defined as sequential or broadcast based on whether they have to react to an event without fail. In particular, a sequential consumer must react to the kinds of events in which it is interested and so a distributor should not withhold those events from the sequential consumer. For example, a communications program would be a sequential consumer of events which notify of the dropping of a connection, since the communication program would need to respond to such an event.

Broadcast consumers typically have a set of kinds of events in which they are interested and want to be notified of the next event from this set as simply as possible. Many broadcast consumers are interested in events that occur only to a limited set of subjects, and so one embodiment of the present invention provides a method for filtering events based on "who" they involve. In addition, the set of events in which the broadcast consumers are interested changes over time as does the immediacy of the interest. Thus, one embodiment of the present invention provides a method which allows the consumer to modify the set of events which will be delivered to the consumer. Lastly, there is no clear pattern as to whether broadcast consumers want to poll the event manager control unit to collect an event, or if they want to be notified asynchronously. Therefore, according to one embodiment, both options are supported.

FIG. 1 is a block diagram showing an exemplary computer on which the software according to the present invention can be implemented. The computer 10 includes a processor (CPU) 12, an external storage device 14, a disk storage device 16, an input/output (I/O) controller 18, an input device 20, an output device 22, a memory 24, and a common system bus 26 connecting each of the above elements. Only one input device and one output device is shown in FIG. 1 for ease of readability purposes. However, it will be appreciated that the computer 10 can include more than one such device. The processor 12, the external storage device 14, the disk storage device 16 and the memory 24 are also connected through the bus 26 and the I/O controller 18 to the input and output devices 20 and 22. In addition, the computer 10 can also be adapted for communicating with a network 27.

Stored within the memory 24 of the computer 10 are a number of pieces of software which can be executed by the processor 12. One of those pieces of software is an operating system 28. In one embodiment, the operating system 28 is a microkernel operating system capable of maintaining multiple address spaces. An event manager 30 resides within the operating system. In an exemplary embodiment, the computer system 10 of the present invention is an Apple Macintosh™ computer system made by Apple Computer, Inc., of Cupertino, Calif., and having a microprocessor and a memory wherein a microkernel operating system 28 that includes the event manager 30 resides. The components of the computer system can be changed within the skill of the ordinary artisan once in possession of the instant disclosure. Although the present invention is described in a Macintosh™ environment, it is within the scope of the invention, and within the skill of the ordinarily skilled artisan, to implement the invention in a DOS, Unix, or other computer environment.

The present invention relates to an architecture for an event manager for managing events that occur in an operating system. Clients of the event manager include event consumers and event producers, that is, applications programs and the various parts of the operating system, such as for example, a file manager.

According to one embodiment, the present invention cooperates with an operating system with a microkernel architecture in which the kernel provides a semaphore synchronization mechanism and a messaging system. The messaging system creates and maintains a set of message objects and one or more port objects. The messaging system has a number of features. It allows a creator-defined value to be associated with each object. The messaging system also allows multiple objects to be mapped to the same port and messages to be either received from a port or have a function be called when a message of an appropriate type is sent to that port. Further, the messaging system allows the receiver of the message to determine the object to which the message was originally sent and to derive the creator-defined value for that object. One example of such a microkernel architecture is provided by NuKERNEL™, used in Apple Macintosh™ computers. The NuKERNEL™ system is described in copending U.S. patent application Ser. No. 08/128,706, filed on Sep. 30, 1993, for a "System For Decentralizing Backing Store Control Of Virtual Memory In A Computer", application Ser. No. 08/220,043, filed on Mar. 30, 1994, for an "Object Oriented Message Passing System And Method", and an application entitled "System and Method Of Object Oriented Message Filtering", filed in the name of Thomas E. Saulpaugh and Steven J. Szymanski, on or about the date of filing of the present application. These three patent applications are incorporated by reference herein.

According to the messaging system, a service is provided by a server, and software wishing to make use of the service is called a client of the server. Messages are sent to a target by clients and received by servers. The message directs the server to perform a function on behalf of the client. Message objects are abstract entities that represent various resources to messaging system clients. These objects may represent, for example, devices, files, or windows managed by a server. Clients send messages to objects, which objects are identified by an identification labelled ObjectID.

Message ports are abstract entities that represent a service. These ports may represent, for example, a device driver, a file system, or a window manager. Servers receive messages from ports, which ports are identified by a label PortID. Objects are assigned to a port. A message sent to an object is received at that object's port. Ports and objects are created by the messaging system on behalf of a server. The creation of an object requires designating a port from which messages sent to the object will be retrieved.

According to one embodiment, the messaging system is used by the event manager in that the event distributors have an associated port and object, the sequential consumers have an associated port and object, and the event manager maintains a port and objects assigned to that port for each broadcast consumer. The events are passed as messages by the event producers to the distributor's associated object, the sequential consumers receive the messages from their associated port, and the broadcast consumers send messages to request events to the event manager via the object maintained for that broadcast consumer. Additionally, according to one embodiment, the event manager uses the message filter mechanism provided in a messaging system to implement sequential consumers. For each sequential consumer, a message filter is created on the distributor's ObjectID. The code which receives messages through the filter checks for matches (on the what and who provided) and forwards the appropriate messages to the sequential consumer. One example of such a message filtering mechanism is described in the above-referenced patent application in the name of Thomas E. Saulpaugh and Steven J. Szymanski.

Figure 2:
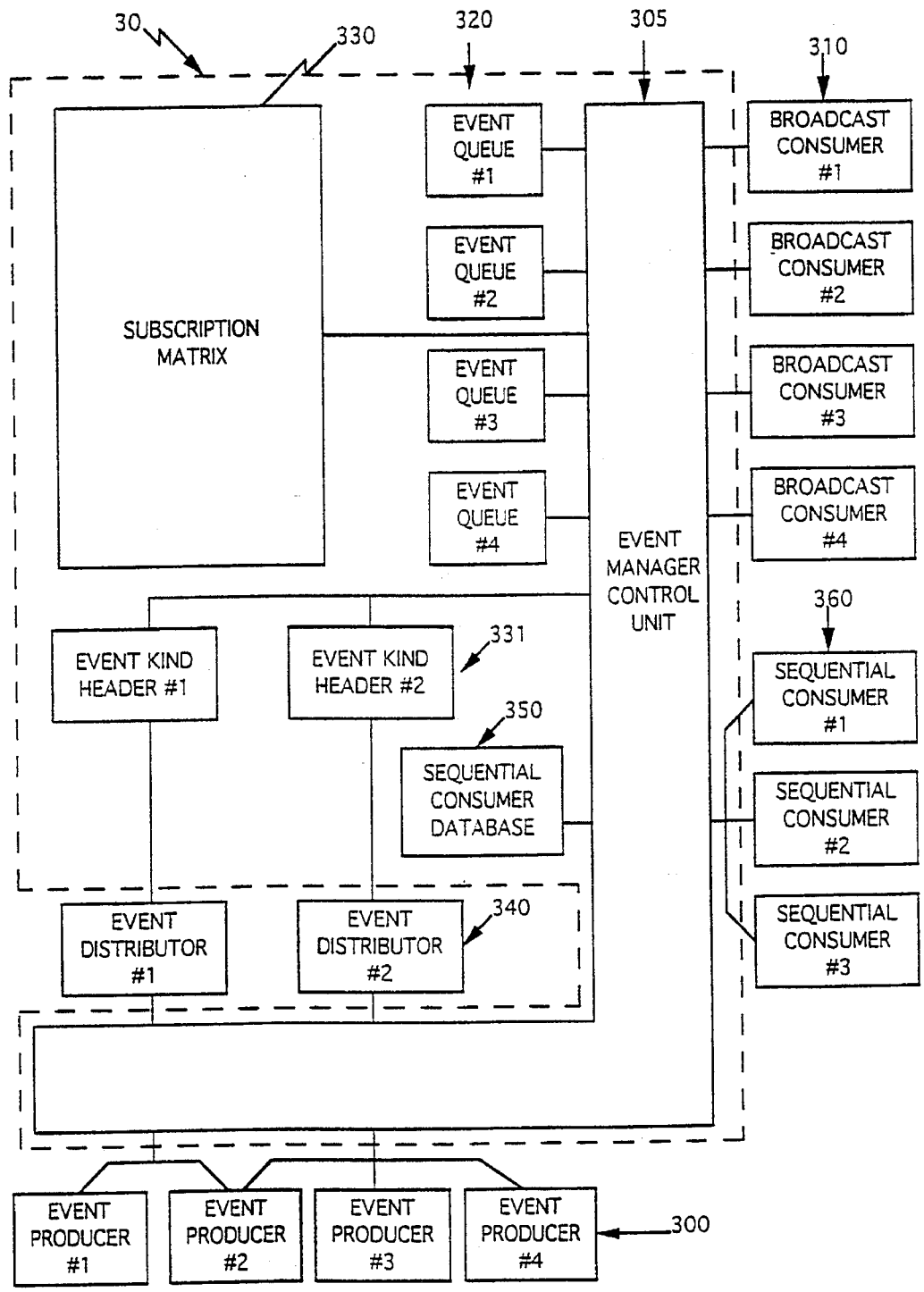
FIG. 2 is a block diagram of the architecture for the event manager according to one embodiment of the present invention.

FIG. 2 is a block diagram of the architecture for the event manager 30 shown in FIG. 1. The event manager 30 (shown by the dashed line in FIG. 2) is operationally connected to and communicates with a plurality of event distributors 340, corresponding in number to the different kinds of events possible within the system, a plurality of event consumers, and a plurality of event producers 300.

According to one embodiment, the plurality of event consumers can include broadcast consumers 310 and sequential consumers 360. It is appreciated that a given system may have either one or more broadcast consumers or one or more sequential consumers, or both.

According to the present invention, events are grouped into "kinds", for example, all keystrokes are one kind of event, all mouse clicks are another kind of event, all new file creations am another kind of event, etc. It is also possible to group the events differently, for example, all depressions of a particular key are one kind of event. This is not a preferred implementation at least in part because the number of kinds of events would quickly become unmanageable. However, the choice of how to group the events is within the skill of the ordinary artisan once in possession of the present disclosure.

The event manager 30 includes an event manager control unit 305 and data structures. The data structures include a subscription matrix 330, a sequential consumer database 350, a plurality of event queues 320 provided in one-to-one correspondence with the broadcast consumers 310, and a plurality of event kind headers 331 provided in one-to-one correspondence with the event distributors 340. The event manager control unit 305 consists of at least one software routine which manages the event manager data structures.

Event producers 300 represent any software on a computer that is responsible for generating an event, or is responsible for detecting that other entities in the computer have generated an event. The event producers generate descriptions of each event they produce or detect. Each kind of event can have any number of event producers, and a given event produce may produce or detect multiple kinds of events. Event consumers, including broadcast consumers 310 and sequential consumers 360, represent any program that needs to be informed when an event has occurred and needs to be informed of the description of that event. Each kind of event can have any number of event consumers, and a given event consumer may need to be notified of multiple kinds of events.

It is possible for an event consumer to be an event producer and for an event producer to be an event consumer. In particular, there are many cases where a piece of software will consume one kind of event, and produce another kind in response. For example, the file manager might consume "disk inserted" events, mount the volumes on the inserted media, and then produce "new volume" events as a result. It is also possible that a given program may subscribe to different kinds of events differently. In particular, the program may subscribe as a sequential consumer for some kinds of events and as a broadcast consumer for other kinds of events.

Event queues 320 are lists of events that are maintained by the event manager control unit 305 for each of the broadcast consumers 310 to hold information about events of interest to the corresponding broadcast consumer. According to one embodiment, the event queues 320 are structured as first-in, first-out lists. Other suitable storage configurations such as lists ordered by event priority or by producer priority, for example, disk inserted events may always have higher priority than mouse clicks or disk event producers may have higher priority than mouse event producers, may also be used. In FIG. 2, event queue #1 is the list of events of interest to broadcast consumer #1, event queue #2 is the list of events of interest to broadcast consumer #2, and so on. Although four broadcast consumer/queue pairs are shown in FIG. 2, it is appreciated that any number of broadcast consumer/queue pairs can be defined at a given time.

Figure 3:
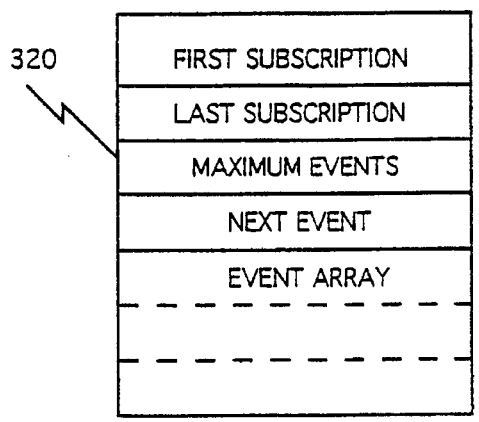
FIG. 3 is an exemplary embodiment of the event queue data structure according to the present invention.

According to one embodiment, the event queues 320 are stored in the format shown in FIG. 3, including the following fields: first subscription; last subscription; maximum events; next event; and event array. The first and last subscription fields are pointers to the first and last subscription for the corresponding broadcast consumer 310. An event subscription is a description of a specific set of events of which a particular broadcast consumer needs to be informed. The maximum events field is the maximum number of events that are to be maintained in the queue for that consumer. According to one embodiment, the size of the event array may be slightly larger than the indicated maximum to provide a cushion. The event array stores the list of events that have occurred in the form of an array of elements, each element being an event to which the corresponding broadcast consumer has subscribed. In one embodiment, the queues are stored in circular buffers, although other suitable storage configurations such as singly and doubly linked lists and dynamic stacks could be used.

Subscription matrix 330 is a structure that maintains the information about all existing event subscriptions. In particular, the subscription matrix 330 is used to keep track of the subscriptions for the events in which the broadcast consumers are interested.

A plurality of sequential consumers 360 may be defined. Although three sequential consumers #1, #2, and #3, are shown in FIG. 2, it is appreciated that any number of sequential consumers can be defined. The sequential consumer database 350 is composed of a plurality of sequential consumer entries which list the events in which each sequential consumer 360 is interested.

Figure 4:
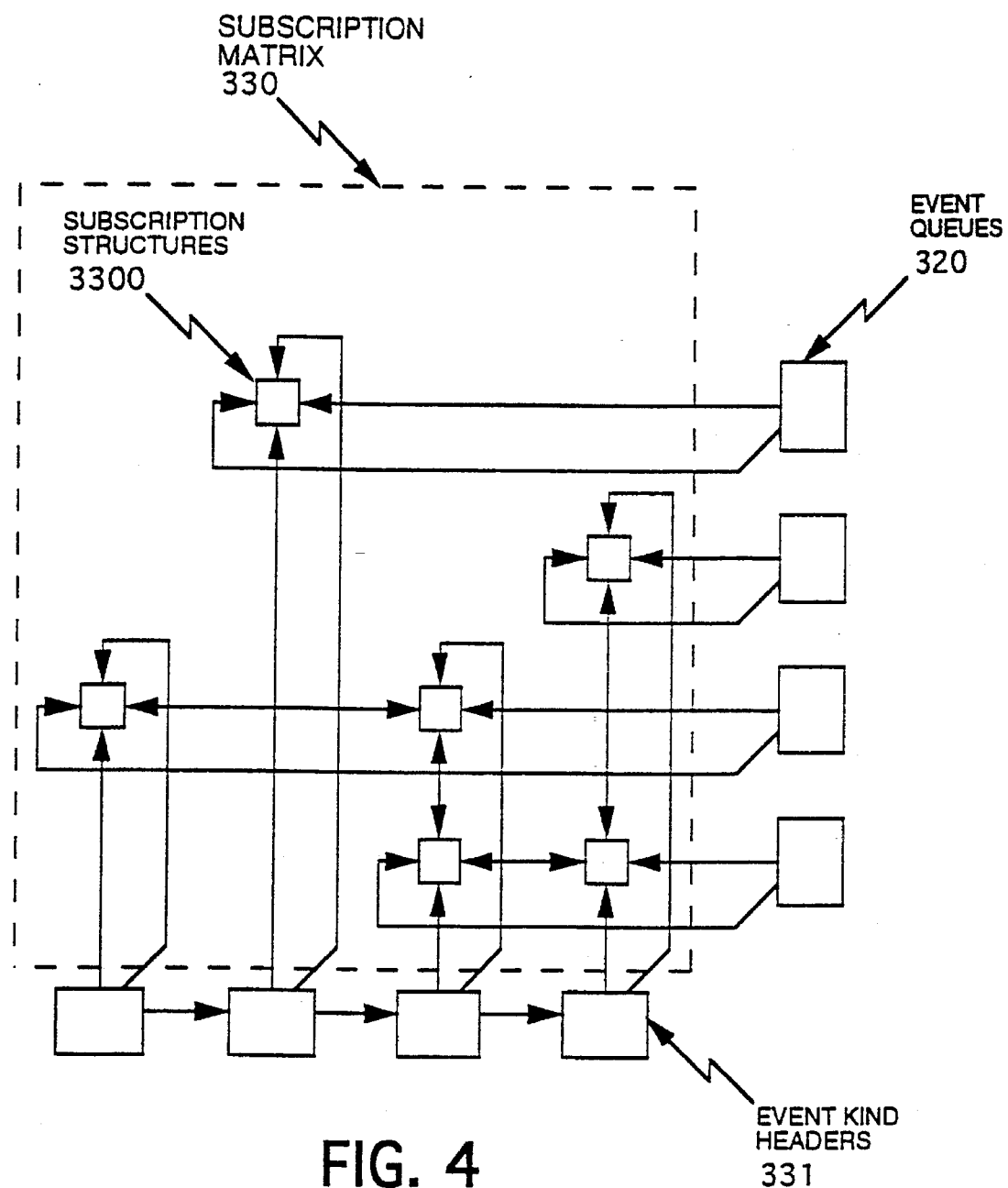
FIG. 4 is an exemplary embodiment of the subscription matrix according to the present invention.

In one embodiment, the subscription matrix 330 can be configured as illustrated in FIG. 4, where there is one subscription structures 3300 stored for each subscription. Other suitable configurations may be used such as sparse arrays, or dynamic lists of subscriptions on the event queue and/or event kind structures. The subscription structures 3300 stored in the subscription matrix are connected to the event queues 320 and the event kind headers 331. In particular, there is one event kind header 331 stored for each kind of event known to the system, thus the number of event kind headers is equal to the number of event distributors. The event kind headers 331 store information for the event manager control unit 305 to use to determine which distributor handles the kind of event currently being processed. A RegisterDistributor (described below) call creates the event kind header.

Figure 5A:
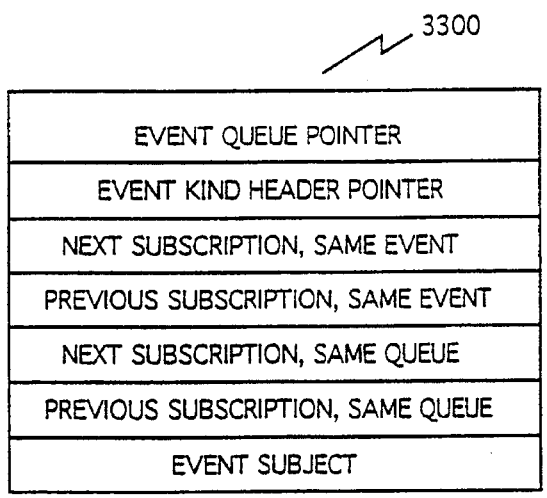
FIG. 5a is an exemplary embodiment of the subscription data structure according to the present invention.

According to one embodiment, the subscriptions 3300 are stored in the subscription matrix 330 in the format shown in FIG. 5a, including the following fields: event queue pointer; event kind header pointer; next subscription, same event; previous subscription, same event; next subscription, same queue; previous subscription, same queue; and event subject. The event queue pointer is a pointer to the event queue to which the subscription belongs. The event kind header pointer is the pointer to the event kind header for the kind of event which is the subject of the subscription. The event subject identifies the structure which the event happened to. The rest of the fields are the pointers to the other subscriptions.

Figure 5B:
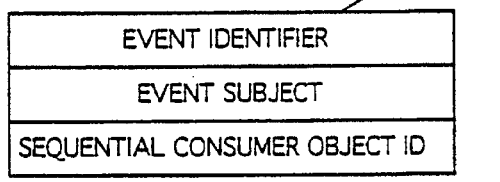
FIG. 5b is an exemplary embodiment of the sequential consumer entry structure according to the present invention.

An exemplary format for the sequential consumer entries is illustrated in FIG. 5b. According to one embodiment, the entries each include the following fields: event identifier, event subject and sequential consumer object ID. The event identifier identifies the kinds of events in which the sequential consumer is interested. The event subject identifies the subject of the events in which the sequential consumer is interested. The sequential consumer object ID identifies the objectID for the sequential consumer which created the entry in the sequential consumer database. According to one embodiment, the sequential consumer database 350 is part of the subscription matrix 330 and there is a pointer to the subscription structure for each sequential consumer. According to another embodiment shown in FIG. 2, the sequential consumer database 350 is provided separately from the subscription matrix 330 as described above. The event manager control unit 305 performs a comparison between the data structure and the detected event to determine whether the event should go to that sequential consumer.

According to one embodiment, the message filtering mechanism is used to maintain the information required to provide the appropriate sequential consumers with the events as they occur. This mechanism is generally described in the Saulpaugh and Szymanski patent application discussed above.

Figure 6:
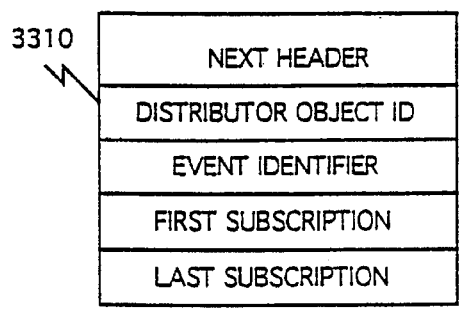
FIG. 6 is an exemplary embodiment of the event kind header data structure according to the present invention.

According to one embodiment, the event kind headers 331 are stored in the format shown in FIG. 6. The event kind header 331 includes the following fields: next header; DistributorObjectId; event identifier; first subscription; and last subscription. The next header field is a pointer to next header in a singly linked list of event kind headers. The DistributorObjectID is the distributor ObjectID for the corresponding event distributor. The event identifier identifies the kind of event the associated distributor handles. The first and last subscription fields are pointers to first and last subscriptions defined for this kind of event.

Event distributors 340 are programs that are responsible for interpreting event subscriptions so as to distribute appropriate events to appropriate broadcast consumers. According to one embodiment, them is an event distributor for handling each kind of event. In particular, there is an event distributor to handle all keystrokes detected by any of the event producers, another event distributor to handle all mouse clicks, and so on.

According to one embodiment, it is up to the distributors to determine which broadcast consumers am notified of the event. The event manager control unit 305, using the subscription matrix 330, keeps track of which consumers want the events, while the distributors have the final say as to which consumers are actually notified. A given distributor might always give the result to all interested consumers, or it might always choose one, or it might ask to see each consumer and choose some and not others. This allows for a very flexible architecture. For example, while all applications will be interested in mouse clicks (and therefore would subscribe to that kind of event), only one (either the frontmost or the application for which a window is clicked on) should actually receive it. The mouse click event distributor determines which of the subscriptions was for the frontmost application and sends it only to that one. Another example would be that there might be several pieces of code which would want to know when a new file was created, and generally all of them should be told. Therefore, the new file event distributor would always send the event to all subscribers.

As shown in FIG. 2, each broadcast consumer 310 communicates with and is operationally connected to its respective event queue 320 through the event manager control unit 305. Each broadcast consumer 310 also communicates with and is operationally connected to the subscription matrix 330 through the event manager control unit 305. The event queues 320 each communicate with and are operationally connected to the subscription matrix 330 through the event manager control unit 305. The sequential consumer database 350 communicates with and is operationally connected to the event manager control unit 305 and the sequential consumers 360 communicate with the sequential consumer database 350 via the event manager control unit 305. The plurality of event kind headers 331 are operationally connected to the plurality of event distributors 340, which are operationally connected to the plurality of event producers 300.

Each broadcast consumer 310 uses the event manager control unit 305 to cream an event queue 320 to hold events in which it is interested between the time the event is reported and the time the broadcast consumer consumes it. Each broadcast consumer 310 communicates to the event manager control unit 305 a set of event subscriptions that describe all the events of which it needs to be informed. This set of event subscriptions may be changed at any time. The event manager control unit 305 stores that information in the subscription matrix to be used by the event distributors 340.

In summary, according to one embodiment of the present invention, event producers 300 detect events and build event descriptions. They send those descriptions to the event manager 30 by calling the event manager control unit 305. The event manager control unit 305 sends the event description to each sequential consumer 360 in turn based on the entries in the sequential consumer database 350. The event manager control unit 305 then sends the event description to the event distributor 340 who is responsible for distributing that kind of event. The event distributor 340 calls the event manager control unit 305 to send the event description to those broadcast consumers 310 which it decides are appropriate based on the information in the subscription matrix 330. The event manager control unit 305 gives the event descriptions to the appropriate broadcast consumers 310 by initially storing those descriptions in the event queues 320. The broadcast consumers 310, when ready, call the event manager control unit 305 to retrieve the next event description stored in its corresponding event queue 320.

APPLICATION PROGRAMMER INTERFACE

According to the present invention, the event consumers, the event producers and the event distributors may be written by third parties other than the manufacturer of the event manager. Therefore, an application programmer interface (API) is defined to provide a specification which allows these third parties to communicate with the event manager. The following is a description of one embodiment of an API which allows communication with the event manager according to the present invention.

Event Structure

Figure 7:
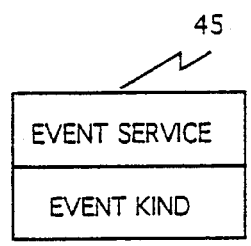
FIG. 7 is an exemplary embodiment of the event name data structure according to the present invention.

According to one embodiment, an event is composed of three parts: what happened (the event identifier), who it happened to (the event subject), and details of how the event happened (the event information). Since it is desirable for the set of possible events to be easily extensible (by the developers of the other parts of the operating system and by applications programmers), the "what" part of the event structure is defined to be a unique identifier referred to as the event name. In one embodiment, the event name identifier can be implemented as a 4 character code known as an OSType. It is appreciated that other suitable identifiers could be used instead by one of ordinary skill once in possession of the present disclosure. According to one embodiment, it can be a pair of identifiers. In particular, in this disclosure, the implementation described uses two OSTypes. An exemplary structure 45 for the event name identifier is shown in FIG. 7. The event service identifier serves as the "signature" or name of the service which defined the event, e.g., a word processing program, and the event kind identifier identifies the event itself, e.g., new file created. Thus, the universe of all names, referred to as the namespace, of events is managed by controlling the signatures.

The "who" field of the event structure, defined according to one embodiment as the event subject, is difficult to define since all possible uses of the event manager can not be anticipated and therefore all forms of the hardware and software elements that the "who" might describe also can not be anticipated. Fortunately, the only public operation which needs to be supported for this part of an event is a test for equality, i.e., equality against a "who" which was provided by a broadcast consumer for a subscription, so the event manager control unit 305 need not know the structure of the subscription and it can be defined as an uninterpreted array of bytes. Suitable configurations of the "who" field can be used, such as a fixed length or a variable length field, within the skill of the ordinary artisan once in possession of the present disclosure.

Figure 8:
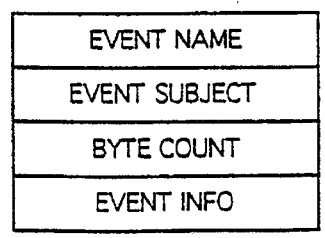
FIG. 8 is an exemplary embodiment of the event data structure according to the present invention.

The "details" part of the structure, that is, the info field in FIG. 8, is totally open ended, and will vary not only with each event, but potentially with each instance of the event. Thus, one embodiment for the structure is an open ended array of bytes.

FIG. 8 is a block diagram of the event structure according to one embodiment of the present invention. The event 40 consists of the event name, event subject, byte count, and event info fields. The event name field specifies the what, the event subject field specifies the who, and the byte count and event into fields specify the how. Event info is the actual data and byte count indicates the length of the data.

System Calls

The event producers are provided with a single call to submit events to the event manager control unit 305. In particular, the call sends the message of an event to the event manager control unit 305. According to one embodiment, the producers then receive confirmation that every consumer who needs to respond to the event has had a chance to process it. In particular, when the call returns, the distributor knows that every sequential consumer has seen it, and it is enqueued for every broadcast consumer. This confirmation is not required and can be omitted according to another embodiment. According to one embodiment, this call has been split into two calls (FindDistributor and ProduceEvent) For efficiency reasons to actor out the identification of who knows how to distribute that kind of event. The API is shown in Table 1.

Table 1 and the succeeding tables present structure definitions written in the C language. While the examples herein are shown in C, it is within the skill of the ordinary artisan to use other suitable programming languages to implement the present invention. In addition, the code shown in the Tables is an example of an implementation of the invention according to one embodiment. It is appreciated that other implementations are possible and within the skill of the ordinary artisan once in possession of the present disclosure.

In Table 1, OSStatus is a type usually used as a return value used to indicate if the call succeeded. OptionBits is a type usually used as an input parameter to a call to allow the user to specify small variations on how the call is to be processed.

TABLE 1

| typedef Object ID | | EventDistributorID; |
|---|---|---|
| typedef OptionBits | | ProduceEventOptions; |
| enum | | |
| { | | |
| kProduceEventsynchronously | | = 0x00000001 |
| // don't return until all Sequential | | |
| Consumers have completed | | |
| } | | |
| OSStatus FindDistributor ( | EventName | eventname, |
| | EventDistributorID | *inputID); |
| OSStatus ProduceEvent ( | EventInformationPtr | event, |
| | EventDistributorID | distributor |
| | ProduceEventOptions | options); |

Consumers

According to one embodiment of the present invention, as discussed above, broadcast consumers and sequential consumers differ in their relationships to other consumers of an event. Broadcast consumers do not need to know if other consumers exist, nor in what order consumers are informed of the event, as long as they themselves are eventually informed. Sequential consumers require that no other consumer be told about an event while they themselves are still processing it, and they require the ability to influence when in the sequence they receive the event. In addition, many sequential consumers require the ability to modify the event itself, and even block an event from being received by other consumers.

According to one embodiment, the API provides a method for filtering events based on "who" they involve to allow broadcast consumers to limit the set of subjects for which they will be notified about events. In addition, the API provides a method which allows the broadcast consumer to modify the set of events in which it is interested over time. Lastly, the API supports the ability of broadcast consumers to poll the event manager control unit 305 to collect an event, or to be notified asynchronously by use of a messaging system providing asynchronous notification functionality.

In the interface according to one embodiment, the consumer calls the event manager control unit 305 to create a consumer structure which embodies a list of events in which the consumer is interested. These structures are opaque to the caller (i.e., its details are known only to the event manager control unit 305).

According to one embodiment, this consumer structure is an event queue 320. The API allows the broadcast consumers to call the event manager control unit 305 to create an event queue. In particular, the event queues 320 are created by the event manager control unit 305 as a result of a CreateBroadcastConsumer call, and they are eliminated as a result of a DisposeBroadcastConsumer call. One embodiment of the details of the queues are illustrated in FIG. 3. The event queue includes, among other things, the name of the consumer (used by distributors to identity specific consumers), and the maximum number of events the event manager control unit 305 will buffer by storing in the event queue for that consumer. The consumer is asked to provide this latter value so the event manager control unit 305 is not committed to an unbounded amount of buffering. Should this value be exceeded, additional events are discarded and the next event the consumer will get is an "Overrun" event from the event manager control unit 305 itself. The example code in Table 2 illustrates this feature.

TABLE 2

| dypedef ObjectID EventConsumerID; | |
|---|---|
| typedef FilterName EventConsumerName; | |
| OSStatus CreateBroadcastConsumer ( | |
| EventConsumerID | *consumer, |
| EventConsumerName | name, |
| uint32 | maxPending); |
| OSStatus DisposeBroadcastConsumer ( | |
| EventConsumerID | consumer); |

Once the broadcast consumer has an EventConsumerID, it subscribes to the kinds of events in which it is interested. As part of the subscription process the broadcast consumer can specify both the EventName and the EventSubject to be matched for determining when the consumer needs to be notified of the event. The policies of how the EventSubject is matched by the event distributor 340 is dependent on the kind of event being processed. According to one embodiment, this can be implemented as a byte-by-byte comparison. Other suitable implementations may be used, for example, if there are three different kinds of events that are identical for subscription purposes, i.e., the same consumers are to be notified of them, therefore, these events are compared as equal even though the actual bits are different. The list of events associated with an EventConsumerID can be expanded at any time using SubscribeBroadcastConsumer, and the events kinds can be removed from the list at any time with UnsubscribeBroadcastConsumer. If a particular kind of event is unsubscribed, any event instances of that kind which have already been collected for that consumer are discarded. This is illustrated in Table 3.

TABLE 3

```
OSStatus SubscribeBroadcastConsumer (
    EventConsumerID              consumer,
    EventName                    eventName,
    EventSubjectPtr              subject);
OSStatus UnsubscribeBroadcastConsumer (
    EventConsumerID              consumer,
    EventName                    eventName,
    EventSubjectPtr              theSubject);
```

Processing Events

The HoldEvents/UnholdEvents calls are provided to simplify some special cases in the processing of events. When a kind of event is held, instances of those events are still collected for the broadcast consumer; however, they will not be returned to the user by a Consume call until they are unheld. In this way, the event manager handles situations in which particular kinds of events are still of interest to a broadcast consumer, but the processing of those events are temporarily impossible or not a priority. According to another embodiment, the same functionality could be provided by creating two separate broadcast consumer IDs, one for the non-held events and one for the holdable events. The broadcast consumer could then choose when to consume from the second EventConsumerID. However, this embodiment may not be completely practical because it is not always possible to anticipate what will belong in which category, and the decision process for holding is often quite removed from the event processing cycle. The HoldEvents/UnholdEvents calls, according to one embodiment, provide a simple interface for separating that decision process. These calls are illustrated in Table 4.

TABLE 4

```
OSStatus HoldEvents ( EventConsumerID    consumer,
    EventName                             eventName,
    EventSubjectPtr                       subject);
OSStatus UnholdEvents ( EventConsumerID  consumer,
    EventName                             eventName,
    EventSubjectPtr                       subject);
```

Finally, when the list of interesting events is built, the broadcast consumer consumers the events which are collected using one of two calls, a synchronous call and an asynchronous call. Both calls specify the consumer objectID to identify the queue, and provide a buffer into which the event is copied. The Async call additionally requires a EventNotification structure which describes the action to be performed when a buffer has been filled in with a new event. According to one embodiment, the EventNotification and EventInformationPtr are types defined by an operating system kernel. If the buffer provided is not large enough to hold the event description, the leading part of the description is copied into the buffer. The rest of the description is dropped. These calls are illustrated in Table 5.

TABLE 5

```
OSStatus ConsumeEvent (
    EventConsumerID              conswner,
    uint32                       maxEventSize,
    EventInformationPtr          event);
OSStatus ConsumeEventASync (
    EventConsumerID              conswner
    EventNotification            *completion,
    uint32                       maxEventSize,
    EventInformationPtr          event);
```

FlushEvents is used to remove events which have been collected for the broadcast consumers but which have not been consumed. The broadcast consumer specifies an EventName (which can use wildcards) and EventSubject. The event manager control unit 305 then disposes of any events which match the description and were collected but not processed. This call is illustrated in Table 6.

TABLE 6

```
OSStatus FlushEvents (
    EventConsumerID              consumer,
    EventName                    eventname,
    EventSubjectPtr              subject);
```

Sequential Consumers have very different requirements tier their API. Since they serve as a bottleneck for the transmission of events, their API should be designed for maximum throughput; and should be structured to require a response for each event to indicate when the event manager control unit 305 can pass the event on to the next sequential consumer or the broadcast consumers. Based on this, the API according to one embodiment of the present invention assumes that events are passed to sequential consumers as messages using a suitable communication facility, such as the messaging system service provided by a microkernel operating system as discussed above. According to one embodiment, the sequential consumer sends a message to the event manager control unit 305 asking for the next event and the event itself is returned in the reply to the message. Other implementations are also possible within the skill of the ordinary artisan once in possession of the present disclosure. According to one embodiment, sequential consumers receive these messages by way of an accept function or by asynchronous receives to allow the receiver to overlap program execution with the receive operation to insure a rapid response time. One example of such a messaging system is provided by NuKERNEL™, discussed above.

According to one embodiment, since the messaging system provides a funneling mechanism, having multiple objects associated with a single port, no subscription calls are needed for sequential consumers. Instead, the sequential consumer will be asked to create an object for each interesting kind of event, and those objects can be associated with ports in any way the consumer desires. The objects are then associated with a kind of event using the API described below. Other suitable embodiments of this feature are within the skill of the ordinary artisan once in possession of the present disclosure.

According to one embodiment, the actual sequencing of the consumers is provided by using the message filtering mechanism to transparently list, screen, alter, or re-route messages. Message filters are a software fabricated message interception device which can be ordered in a predetermined priority order to allow certain filters to take precedence over others. One embodiment of the present invention implements the sequencing of the consumers using this ordering capability. This mechanism is described in detail in the copending application filed in the name of Saulpaugh and Szymanski referenced above.

The InstallSequentialConsumer call is used to tell the event manager control unit 305 that events of the given name and subject should be passed to the given object. The name, ordering and options parameters are used to determine the exact ordering in which those events are given to the sequential consumers that are interested in them. The RemoveSequentialConsumer call is used to remove the installed sequential consumer. The installation and removal calls are illustrated in Table 7.

TABLE 7

```
typedef FilterID SequentialConsumerID;
typedef FilterName
SequentialConsumerName;
OSStatus InstallSequentialConsumer (
    SequentialConsumerID          *consumer,
    SequentialConsumerName        consumersName,
    ObjectID                      consumersObject
    FilterOptions                 consumerOptions,
    FilterobjectPair              consumerOrdering,
    EventName                     eventname,
    EventSubjectPtr               eventSubject);
OSStatus RemoveSequentialConsumer (
    SequentialConsumerID          consumer);
```

Once a sequential consumer has been installed and has received or consumed an event, the sequential consumer needs to indicate when it is done with the event so the event manager control unit 305 can pass it on to the next sequential consumer (or to the broadcast consumers if there am no more sequential ones). In particular, the sequential consumer makes a NextConsumer call to the event manager control unit 305 indicating that it has completed processing of the event. The event manager control unit 305 then passes the event to the next sequential consumer or to the appropriate broadcast consumers. Instead of passing the event on, a sequential consumer has the ability to declare an event handled so that it will not be distributed to any more consumers of any type. In particular, a sequential consumer can make an EventHandled call to prohibit further distribution of the event. These two calls are illustrated in Table 8. In one embodiment, NextConsumer uses the messaging system call ContinueMessage which acts as an automatic forward command to continue to the next object in a filter chain in the messaging system, and EventHandled uses the messaging system call ReplyToMessage which specifies that all the objects in a chain have processed the message. This mechanism is described in detail in the copending application filed in the name of Saulpaugh and Szymanski referenced above.

TABLE 8

```
OSStatus NextConsumer (   MessageID   eventMessageID);
OSStatus EventHandled (   MessageID   eventMessageID);
```

Distributors

As discussed above, each distributor is responsible for processing different kinds of events. Each distributor must therefore know the events for which it is responsible.

According to one embodiment, most events are routed through the appropriate sequential consumers and then copies are given to all of the broadcast consumers who have expressed interest. According to a default implementation, any matching of event subjects by the event distributors is done by direct byte comparison of the whole value to determine which consumers have to be notified of the event. Other suitable implementations are within the skill of the ordinary artisan once in possession of the present disclosure.

According to one embodiment, a default distributor is provided to pass certain kinds of events to all broadcast consumers. For example, events such as battery low events will always be distributed to all interested consumers. Each event that can be distributed by the default distributor must register with the default distributor by the RegisterEventWithDefaultDistributor call, illustrated in Table 9. This call is made one time per kind of event over the life of the system to tell the default distributor that it is responsible for those events.

TABLE 9

```
OSStatus RegisterEventWithDefaultDistributor(
    EventName      eventName);
```

A custom distributor is registered with the event manager control unit 305 for handling each kind of event that is not handled by the default distributor. According to one embodiment, registering a custom distributor with the event manager control unit 305 is performed by a call which associates an event with an object so that when the associated event occurs, the event manager control unit 305 knows which distributor will handle the distribution of that event. The custom distributors are independently loaded services and all communication between producers and distributors is accomplished by sending and receiving messages. To receive the events to process and distribute, each distributor must provide an ObjectID to which events are sent from the producers. Calls for registering and unregistering custom distributors are illustrated in Table 10.

TABLE 10

```
OSStatus RegisterDistributor(
    EventName         eventname,
    ObjectID          distributor);
OSStatus UnregisterDistributor(
    EventName         eventname,
    ObjectID          distributor);
```

There are several cases where the distributor needs to apply more complicated heuristics to the process of determining which broadcast consumers should receive notification of events reported by the producers. The information in the subscription matrix is available to the distributor to help determine which broadcast consumers to notify. According to one embodiment, a distributor cannot give an event to a broadcast consumer who has not asked for it, and the distributor looks in the subscription matrix to find out who asked for it. However, distributors are allowed to give the event to only a subset of the broadcast consumers who asked for it. The kinds of ways a distributor might need to effect the distribution of events include:

1. The way in which event subjects are matched is more complicated than direct byte comparison. There may be substructure in the subject identification which needs to be taken into account, or there may be some form of wildcard processing which needs to be handled.

2. Particular events may need to be routed to a subset of the broadcast consumers who have expressed interest, perhaps only one. For instance, mouse events need to be routed to only the one appropriate application or those applications which are interested in them.

3. Related events may need to be combined. For instance, multiple update region events for the same window should be combined until the application actually consumes the event.

Note that none of these possibilities affect sequential consumers. This is because one of the reasons sequential consumers are needed is to influence the distribution process. In other words, sequential consumers are so labelled because for the kinds of events in which they are interested, they must react to the event. Thus, there are no circumstances under which a distributor would choose not to send the event to a particular sequential consumer. Therefore, the event manager control unit 305 automatically sends all produced events through the gauntlet of sequential consumers before handing them off to the distributors.

Figure 9A:
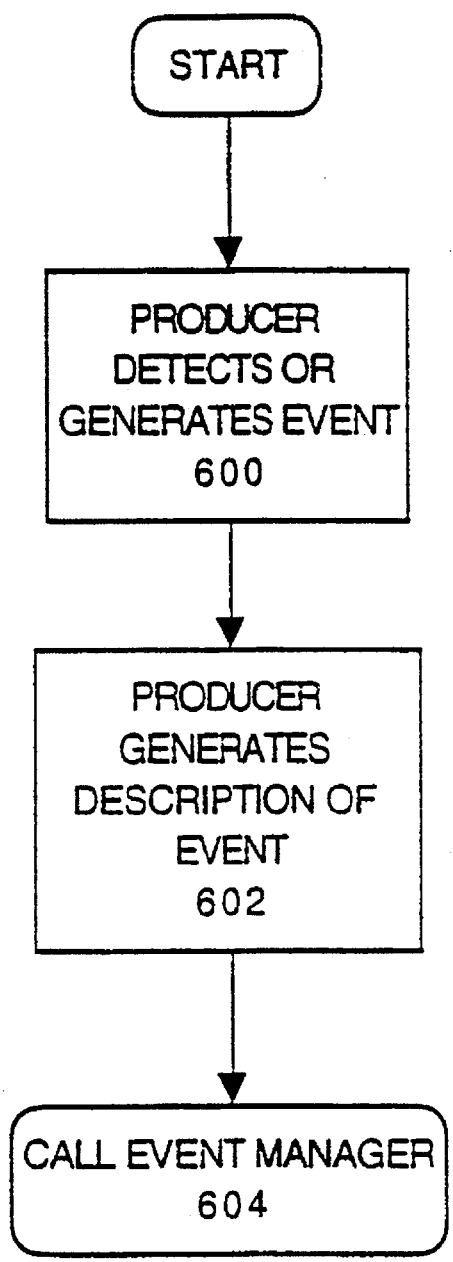
FIGS. 9A, 9B, 9C and 9D are flowchart illustrating the event handling process from the event producers' and the event distributors' point of view according to one embodiment of the present invention.
Figure 9B:
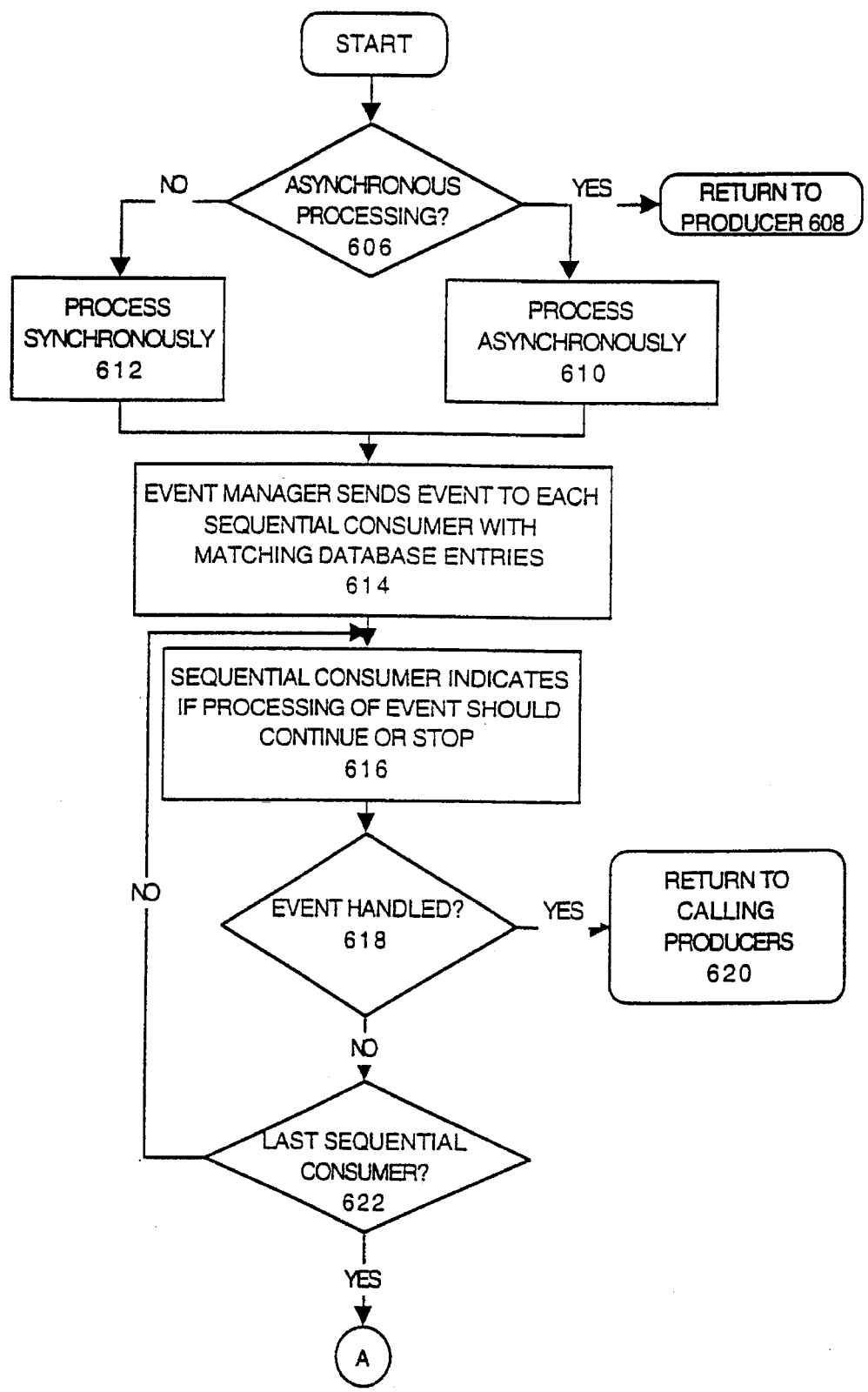
Figure 9C:
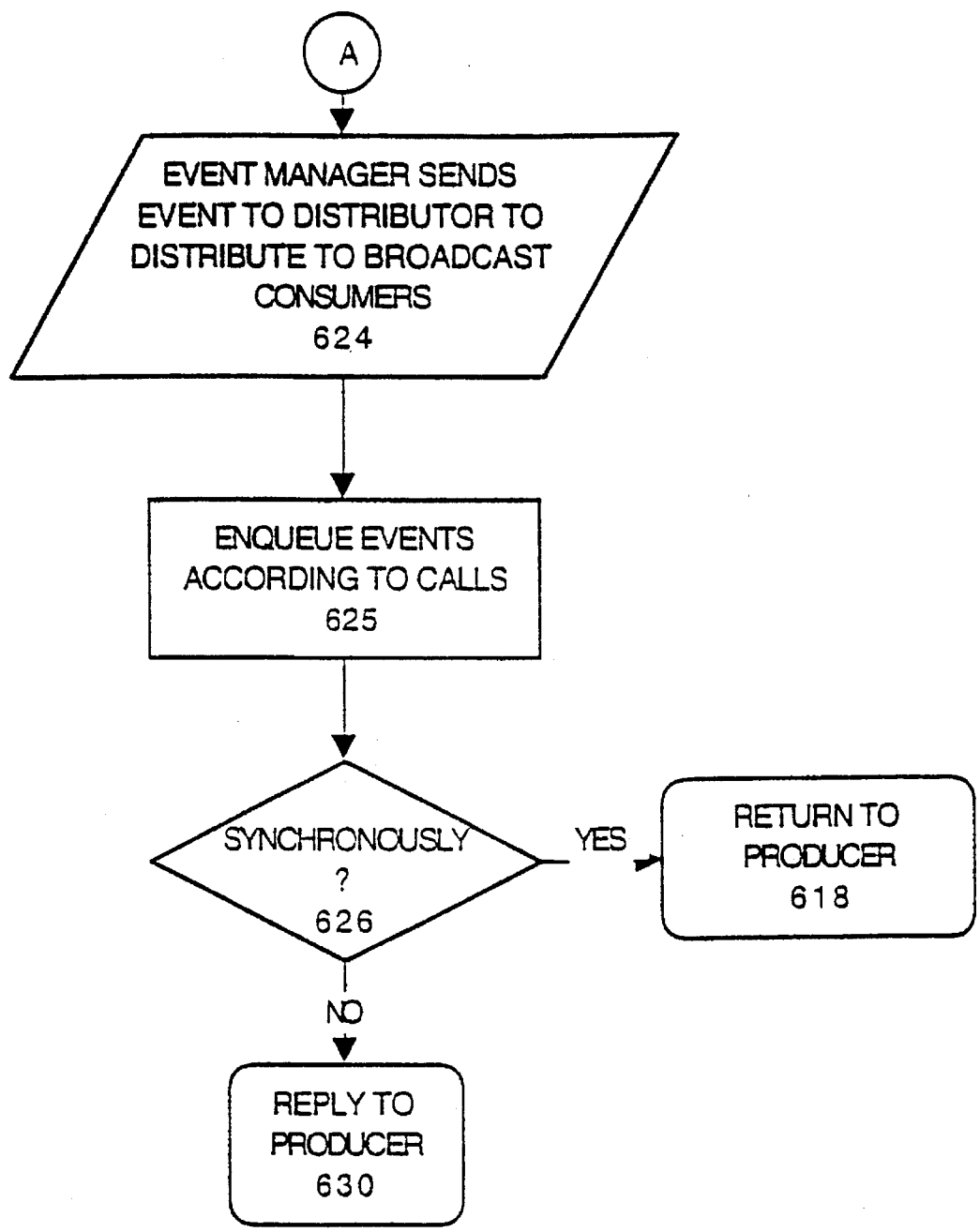

FIGS. 9A, 9B, and 9C are flowcharts illustrating the event handling process from the event producers' and the event distributors' point of view according to one embodiment of the present invention.

As shown in FIG. 9A, the event producer first detects or generates an event (step 600). The event producer generates a description of the event (step 602) and calls the event manager control unit 305 to send the event to the appropriate event consumers, both broadcast and sequential consumers (step 604).

FIG. 9B illustrates the processing of the event by the event manger control unit 305 according to one embodiment of the present invention. It is appreciated that although the following description assumes the use of a messaging system to send the events between elements of the computer, suitable alternative embodiments can be implemented by an ordinarily skilled artisan once in possession of the present disclosure.

At step 606, a determination is made whether the event producer needs to know when the event has been handled, that is, whether to process the request asynchronously or synchronously. If the event producer does not need to know when the event has been handled (as indicated by an input parameter to the call), it returns to the producer (step 608) and processes the rest of the steps in this Figure asynchronously (step 610). If the event producer does need to know, the steps are processed synchronously (step 612).

The test is implemented by making the message sent in step 606 an asynchronous message, otherwise it is a synchronous message. In particular, the event producer calls the event manager control unit 305 to send a message concerning the detected event. The producer provides an input parameter having a value which indicates whether it wants to wait for a response, in which case the message is sent synchronously. Otherwise, the message is sent asynchronously. By definition, if the message is sent synchronously, the event manager control unit 305 does not return from that call until the message has been processed by all sequential consumers; if the message is sent asynchronously, as soon as the message is sent, the event manager control unit 305 returns back to the event producer so that the event producer does not know whether the message is processed.

At step 614, the event manager control unit 305 sends the event to each sequential consumer having an entry in the sequential consumer database 350 matching the event description. This is done one at a time, and each sequential consumer can, by calling the event manager control unit 305, either have the message sent to the next sequential consumer or declare that the event has been handled. Thus, after the sequential consumer completes processing the event, the sequential consumer indicates whether processing of the event should continue or whether the event processing should stop because the event has been handled (step 616). A determination is then made by the event manager control unit 305 whether that sequential consumer indicated that the event was handled (step 618). If so, the event is prohibited from being distributed to any other consumers and so the routine returns to the calling producer. If the sequential consumer indicated that the event was not handled, a determination is made whether that sequential consumer is the last one (step 622). If not, the distributor returns to step 616 to distribute the event to the next sequential consumer.

Referring now to FIG. 9C, when the event has been distributed to all sequential consumers (step 622), the event manager control unit 305 sends the event to the event distributor responsible for that kind of event to distribute to the broadcast consumers (process 624). The event is sent as a message to the distributor. The messaging system automatically passes it on to the distributor when all of the filters have processed it and none have replied (thereby declaring the event handled). Other suitable implementations are possible, such as having the event manager control unit 305 call the event distributor at this point, are within the skill of the ordinary artisan once in possession of the present disclosure.

Figure 9D:
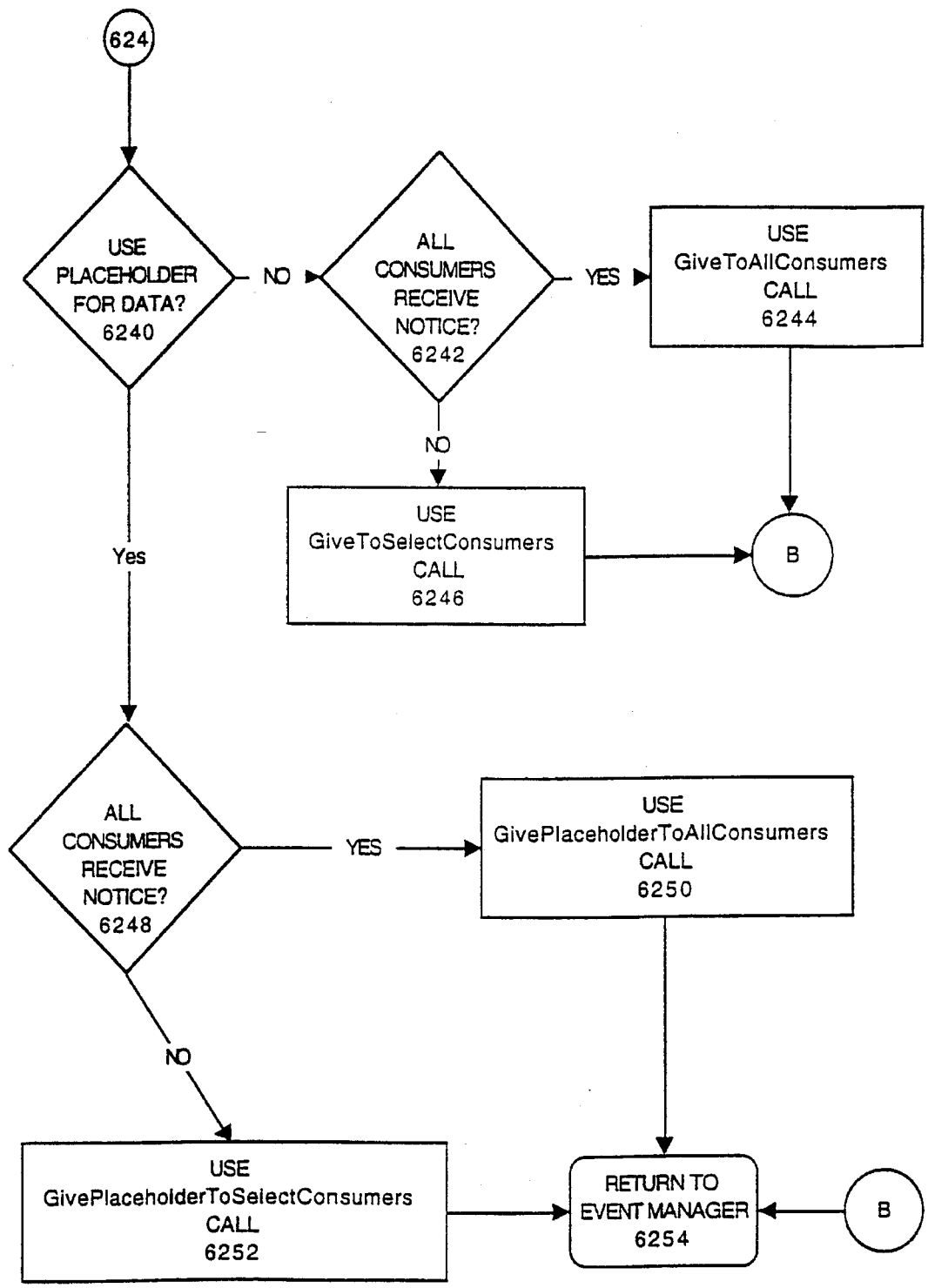

Process 624 is illustrated in FIG. 9D. The distributor decides how to distribute the event in this process. According to one embodiment, it can do this by calling the event manager control unit 305 to sequence through all of the subscriptions for that kind of event to see, which of the consumers who have subscribed should get the event.

One situation is where the distributor needs to route an event to all or some of the consumers; but needs to be able to modify the event data itself up until the point at which the consumer receives and consumes it (step 6240). For example, in a windowing environment, when a window is uncovered (i.e., the topmost window is closed), a window uncovered event is generated. Because it is possible that another portion of the uncovered window may still be uncovered, the window uncovered event distributor wants to be able to modify this event up until the point at which it is consumed. In this case, the distributor submits a place holder structure for the actual message, and gives it to the appropriate consumers.

The place holder structure includes a reference constant field, RefCon, to be used by the distributor to identify the event, and an ObjectID to be used to get the actual data from the distributor. The distributor provides the value of the RefCon field when it creates the placeholder, and is responsible for being able to take that value and provide back the actual event description. Thus, when the consumer actually tries to consume the placeholder, the event manager control unit 305 sends a message to the given ObjectID containing the placeholder RefCon. The distributor then fills in the buffer with the actual, current event description and the consumer's buffer is passed to Consume. Since this functionality needs to be provided for both select and all consumers, two calls are provided as shown in Table 11. If all consumers are to be notified of an event using a place holder (step 6248), the GivePlaceholderToAllConsumers call is used (step 6250). If only select consumers are to be notified of an event using a place holder (step 6248), the GivePlaceholderToSelectConsumers call is used (step 6252).

TABLE 11

OSStatus GivePlaceholderToAllConsumers
Event InformationPtr        event,
void*                       placeholderRefCon,
ObjectID                    fullfilemntID);

TABLE 11-continued

```
OSStatus
GivePlaceholderToSelectConsumers
        EventInformationPtr              event,
        ConsumerFilterFunction           fliterFunc,
        void*                            placeholderRefCon,
        ObjectID                         fullfilemntID);
```

If the distributor does not need to modify the event data, the result of the determination at step 6240 is no. Then, in step 6242, a determination is made if all of the broadcast consumers should receive the event. Note that if this is the case all of the time, it is preferable to use the default distributor which automatically notifies all consumers. Alternatively, if special processing is required only for a subset of events, for any event not in that subset, the GiveEventToAllConsumers call can be used to invoke the distribution mechanism (step 6244). This call is illustrated in Table 12.

TABLE 12

```
OSStatus
GiveEventToAllConsumers(EventInformationPtr    event);
```

The situation in which the distributor needs to choose a subset of the consumers to receive the message may occur either because the distributor needs to process any subject matches or because the nature of the event requires limiting the distribution is detected by a no response to the test in step 6240. In particular, in cases where a byte-by-byte comparison of the subject field is not desired, the distributor is responsible for determining if the subjects match. To accomplish this, the GiveEventToSelectConsumers call is used (step 6246), and a filter function, ConsumerFilterFunction, is called for each consumer who has subscribed to that kind of event (regardless of the subject they specified). The function returns true if the event should be given to that consumer, false if not. This call is illustrated in Table 13.

TABLE 13

```
typedef Boolean (*ConsumerFilterFunction)(
        EventInformationPtr       event,
        EventConsumerName         consumer,
        EventSubjectPtr           subsciptnSubj);
OSStatus GiveEventToSelectConsumers(
        EvenInformationPtr        event,
        ConsumerFilterFunction    filterFunc);
```

After each of the calls at steps 6244, 6246, 6250, and 6252, the routine returns to the event manager control unit 305 (step 6254).

Referring now to FIG. 9C, at step 625, the event manager control unit 305 enqueues the event according to which call was used in FIG. 9D. According to one embodiment, the events are enqueued and dequeued in a first in, first out (FIFO) order. When an event consumer is ready to act on an event, it dequeues the top most event in the event queue and handles it as required.

If the steps of FIG. 9B were processes synchronously (step 626), the routine returns to the producer at step 628. Otherwise, the routine replies to the producer's message (step 630).

Figure 10:
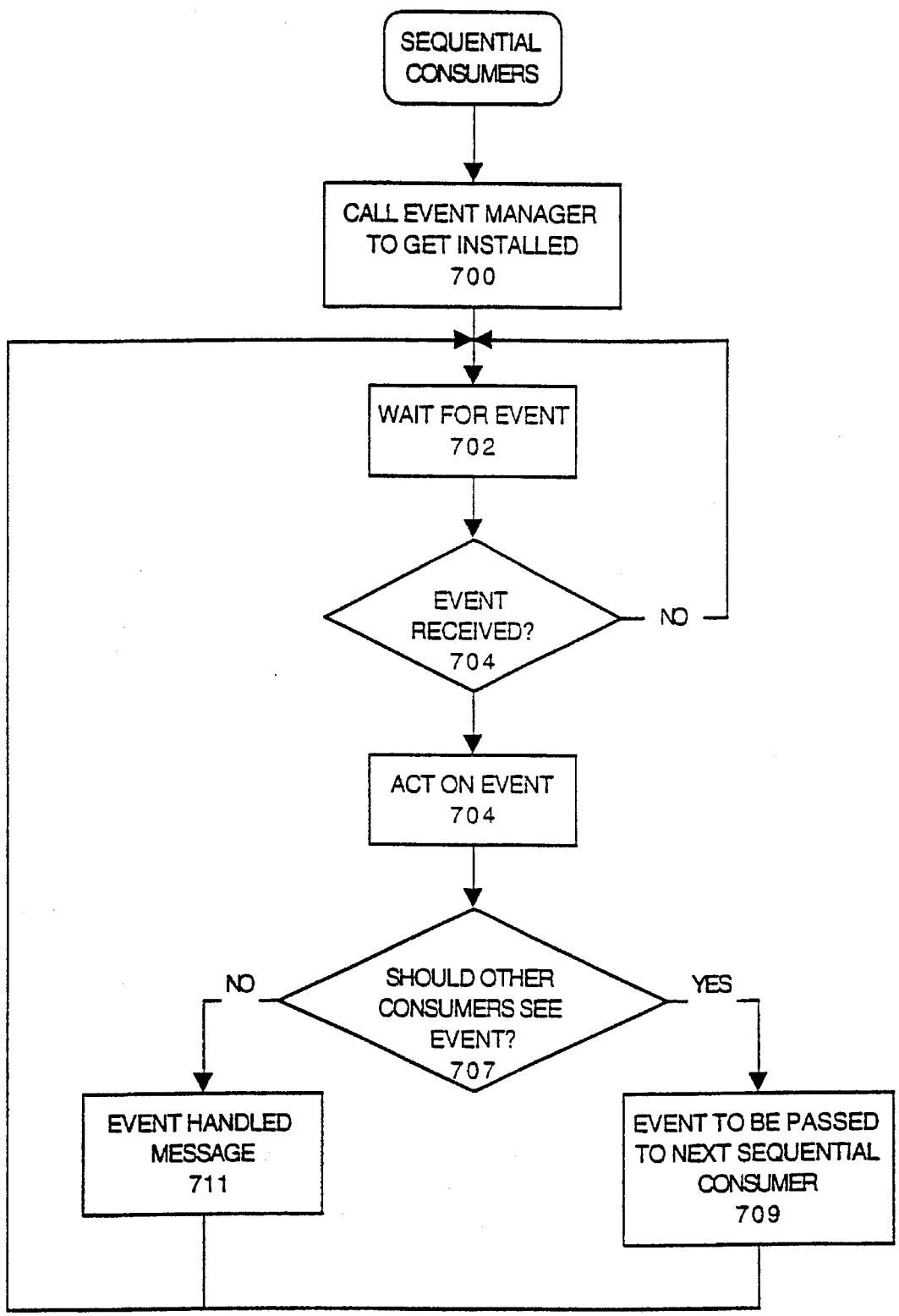
FIG. 10 is a flowchart illustrating the event handling process from the sequential consumers' point of view according to one embodiment of the present invention.

FIG. 10 is a flowchart illustrating the event handling process from the sequential consumers' point of view according to one embodiment of the present invention. First, the sequential consumer calls the event manager control unit 305 to get installed (step 700). According to one embodiment, the consumer provides an ObjectID to which events are to be sent as messages. It is appreciated that other suitable implementations are possible, for example, the consumer could provide a function pointer which is called with a pointer to the event description. Such suitable implementations are within the skill of the ordinary artisan once in possession of the present disclosure.

The sequential consumer does whatever it wants while waiting for an event to occur (step 702). According to one embodiment, since events are sent as messages, the sequential consumer calls the messaging system to either accept or receive a message through the given Object. Other things may be done by the sequential consumer, depending on whether the process is synchronous or asynchronous.

When an event is received (step 704), the sequential consumer acts on the event in the appropriate way (step 706). The sequential consumer then decides whether it wants other consumers (sequential or broadcast) to see this event or if it has handled the event well enough that others should not see it (step 707). If the event is done, and others should not see it, an event handled message is sent by calling the event manager control unit 305 (step 711). Otherwise, the sequential consumer calls the event manager control unit 305 to say that the event should be passed to the next consumer (step 709). The sequential consumer then loops back to the wait state of step 702.

Figure 11:
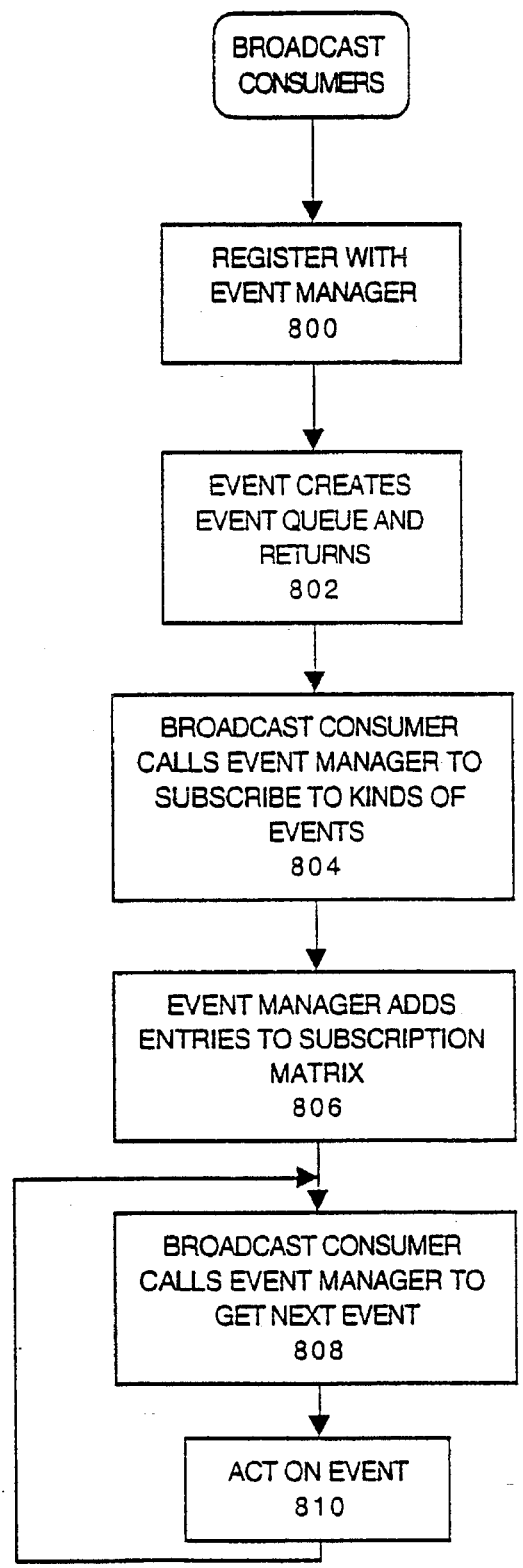
FIG. 11 is a flowchart illustrating the event handling process from the broadcast consumers' point of view according to one embodiment of the present invention.

FIG. 11 is a flowchart illustrating the event handling process from the broadcast consumers' point of view according to one embodiment of the present invention. The broadcast consumer first calls the event manager control unit 305 to register itself using the CreateConsumer call. Once registered, the distributor will start receiving messages through the object referred to by the given ObjectID. The contents of these messages are the descriptions generated by the producers of the events they have detected or generated. The distributor must then indicate to the event manager control unit 305 which of the currently executing consumers should receive the event. In one embodiment, the messaging system routes events from the producers, through the sequential consumers, and into the distributors. The distributor then uses the event manager control unit 305 to put the event on the appropriate queues.

The event manager control unit 305 creates an event queue for the consumer and returns (step 802). The broadcast consumer then calls the event manager control unit 305 to subscribe to particular kinds of events in which it is interested (step 804). The event manager control unit 305 adds the entries in the subscription matrix to keep track of the consumer's subscriptions (step 806).

The consumer calls the event manager control unit 305 to get the next event (step 808). According to one embodiment, this is implemented by having the consumer send a message to the event manager control unit 305. The reply to that message will be the next event for that consumer. The consumer has the option of doing this synchronously or asynchronously, and the consumer either sends the message synchronously or asynchronously accordingly. Other suitable implementations are possible within the skill of the ordinary artisan once in possession of the present disclosure. The consumer acts on the event as it sees fit (step 810), and the process loops back to step 808.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. In a computer including at least one event producer for detecting that an event has occurred in the computer and generating an event and at least one event consumer which needs to be informed when events occur in the computer, a system for distributing events comprising:

storing means for storing a specific set of events of which said at least one event consumer is to be informed;

event manager control means for receiving the event from the event producer, comparing the received event to the stored set of events, and distributing an appropriate event to an appropriate event consumer; and distributor means for receiving the event from the control means and directing said control means to distribute an appropriate event to an appropriate event consumer.

2. The system according to claim 1, wherein said distributor means comprises a distributor module for each kind of event possible in the computer.

3. The system according to claim 1, wherein a plurality of event consumers are included in the computer and the plurality of consumers comprise:

broadcast consumers having no relationship with other consumers, the broadcast consumers operating independently of other consumers and of the order in which consumers are informed of the event; and sequential consumers having relationships with other consumers, the sequential consumers requiring that no other consumer be told about an event while they themselves are processing the event and having an ability to influence when they receive the event relative to the other consumers.

4. The system according to claim 3, wherein said distributor means comprises:

means for determining if the event is to be sent to broadcast consumers with a signal indicating that the distributor means maintains a right to modify the event based on subsequent events until the broadcast consumers receive the event; and means, responsive to a positive determination by said means for determining, for directing said control means to distribute the event to the appropriate broadcast consumers with a signal indicating that the distributor means maintains the right to modify the event.

5. The system according to claim 3, wherein said distributor means comprises:

first means for determining if the event is to be sent to broadcast consumers with a signal indicating that the distributor means maintains a right to modify the event;

second means, responsive to a positive determination by said first means for determining, for determining if the event is to be passed to all broadcast consumers;

means, responsive to a positive determination by said second means for determining, for directing said control means to distribute the event to all broadcast consumers with a signal indicating that the distributor means maintains the right to modify the event;

means, responsive to a negative determination by said second means for determining, for directing said control means to distribute the event to select broadcast consumers with a signal indicating that the distributor means maintains the right to modify the event;

third means, responsive to a negative determination by said first means for determining, for determining if the event is to be sent to all broadcast consumers;

means, responsive to a positive determination by said third means for determining, for directing said control means to distribute the event to all broadcast consumers; and means, responsive to a negative determination by said third means for determining, for directing said control means to distribute the event to select broadcast consumers.

6. The system according to claim 3, wherein said storing means comprises:

a subscription matrix for storing subscriptions to events in which the broadcast consumers are interested; and a sequential consumer database for storing entries to events in which the sequential consumers are interested.

7. The system according to claim 3, wherein said storing means comprises an event queue corresponding to each of the broadcast consumers for receiving distributed events from said control means and for storing the distributed events until the events are consumed by the corresponding broadcast consumer.

8. The system according to claim 3, wherein said control means comprises means for passing an event to the sequential consumers in succession in accordance with the entries in the sequential consumer database.

9. The system according to claim 8, wherein said control means comprises means for prohibiting passing of an event upon receiving an event handled message from a sequential consumer.

10. A computer system comprising:

event producers for detecting that an event has occurred in the computer, generating an event, and generating a description of the event;

event consumers which need to be informed when events occur in the computer, said event consumers comprising a first and a second class of consumers;

storing means for storing a specific set of events of which the event consumers are to be informed;

event manager control means for receiving the event from the event producers and comparing the received event to the stored set of events;

distributor means, responsive to said event control means, for deciding if an event should be passed to an event consumer;

said event manager control means comprising:
first means for sending an event to appropriate event consumers of a first class in accordance with the stored set of events, and
second means for sending the event to appropriate event consumers of a second class responsive to said distributor means.

11. The system according to claim 10, wherein said distributor means comprises a distributor module for each kind of event possible in the computer.

12. The system according to claim 10, wherein said first class of consumers comprise sequential consumers having relationships with other consumers, the sequential consumers requiring that no other consumer be told about an event while they themselves are processing it, and having an ability to influence when they receive the event relative to the other consumers; and said second class of consumers comprise broadcast consumers having no relationship with other consumers, the broadcast consumers operating independently of other consumers and of the order in which consumers are informed of the event.

13. The system according to claim 12, wherein said distributor means comprises:

means for determining if the event is to be sent to broadcast consumers with a signal indicating that the distributor means maintains a right to modify the event based on subsequent events until the broadcast consumers receive the event; and means, responsive to a positive determination by said means for determining, for directing said control means to distribute the event to the appropriate broadcast consumers with a signal indicating that the distributor means maintains the right to modify the event.

14. The system according to claim 12, wherein said storing means comprises:

a subscription matrix for storing subscriptions to events in which the broadcast consumers are interested; and a sequential consumer database for storing entries to events in which the sequential consumers are interested.

15. The system according to claim 12, wherein said storing means comprises an event queue corresponding to each of the broadcast consumers for receiving distributed events from said control means and for storing the distributed events until the events are consumed by the corresponding broadcast consumer.

16. The system according to claim 12, wherein said control means comprises means for passing an event to the sequential consumers in succession in accordance with the entries in a sequential consumer database.

17. The system according to claim 16, wherein said control means comprises means for prohibiting passing of an event upon receiving an event handled message from a sequential consumer.

18. A method for distributing events occurring in a computer, said method comprising the steps of:

determining that an event has been detected by an event producer in the computer;

storing, in a storing means, a specific set of events of which an event consumer is to be informed;

receiving the event in an event control means from the event producer;

comparing the received event to the stored set of events;

receiving the event in a distributor means from the control means;

directing the control means to distribute an appropriate event to an appropriate event consumer; and distributing, via the control means, an appropriate event to an appropriate event consumer.

19. The method according to claim 18, wherein the event consumer comprises a plurality of consumers including broadcast consumers which operate independently from one another and of the order in which consumers are informed of events and sequential consumers which require that no other consumer be told about an event while they themselves are processing it and have an ability to influence when they receive the event relative to the other consumers.

20. The method according to claim 19, wherein said step of distributing comprises the steps of:

determining if the event is to be sent to broadcast consumers with a right to modify the event based on subsequent events until the broadcasts consumers receive the event; and distributing the event to the appropriate broadcast consumers with the right to modify responsive to a positive determination by said step determining.

21. The method according to claim 19, wherein said step of storing comprises the steps of:

storing, in a subscription matrix, subscriptions to events in which the broadcast consumers am interested; and storing, in a sequential consumer database, entries to events in which the sequential consumers are interested.

22. The method according to claim 19, further comprising the steps of:

receiving distributed events in an event queue corresponding to a broadcast consumer; and storing the distributed events in the event queue until the events are consumed by the corresponding broadcast consumer.

23. The method according to claim 19, wherein the step of distributing comprises the step of passing an event to the sequential consumers in succession upon receiving a continue message from a sequential consumer indicating that it has completed processing of the event.

24. The method according to claim 23, wherein the step of distributing further comprises the step of prohibiting passing of an event upon receiving an event handled message from a sequential consumer.

* * * * *

UNITED STATES PATENT AND TRADEMARK OFFICE
CERTIFICATE OF CORRECTION

PATENT NO. : 5,566,337
DATED : October 15, 1996
INVENTOR(S) : Steven J. SZYMANSKI, et al.

It is certified that error appears in the above-indentified patent and that said Letters Patent is hereby corrected as shown below:

Item [57]
Replace the Abstract as follows:

In a computer including event producers for generating events and detecting that an event has occurred in the computer and event consumers which need to be informed when events occur in the computer, a system distributes information about the events. The system includes a store for storing a specific set of events of which an event consumer is to be informed, an event manager control unit for receiving the event from an event producer, comparing the received event to the stored set of events, and distributing the appropriate event to the appropriate event consumer, and a distributor for receiving the event from the control unit and directing the control unit to distribute the appropriate event to the appropriate event consumer. The system manages events within the computer by facilitating communication between the event producers and the event consumers without requiring each event producer to be aware of all of the event consumers.

Signed and Sealed this

Twenty-eighth Day of January, 1997

Attest:

BRUCE LEHMAN

Attesting Officer    Commissioner of Patents and Trademarks